United States Patent [19]
Fairchild

[11] 3,725,865
[45] Apr. 3, 1973

[54] ELECTRONIC ALARM SYSTEM

[75] Inventor: Anthony Prince Fairchild, Aspen, Colo.

[73] Assignee: Synectron, Inc., Aspen, Colo.

[22] Filed: May 3, 1971

[21] Appl. No.: 139,792

[52] U.S. Cl. ............................... 340/172, 340/213
[51] Int. Cl. ............................................ G08b 19/00
[58] Field of Search......340/150, 181, 183, 171, 420, 340/147, 349, 214, 213, 172, 164

[56] References Cited

UNITED STATES PATENTS

| | | | |
|---|---|---|---|
| 3,401,234 | 9/1968 | Heald | 340/213 |
| 3,550,086 | 12/1970 | Ervin | 340/150 |
| 3,550,111 | 12/1970 | Ervin | 340/213 X |
| 3,588,828 | 6/1971 | Schulein | 340/172 X |

*Primary Examiner*—Donald J. Yusko
*Attorney*—Birch, Swindler, McKie & Beckett

[57] ABSTRACT

An electronic alarm system providing an indication of conditions existing at a number of locations with each location being equipped with a number of sensors for indicating each of a number of different types of conditions. Each sensor at a given location, when actuated, produces a step voltage output having an amplitude different from the amplitudes produced by the other sensors at that location. The step voltage output of a sensor at a given location is modulated by one signal of a dual frequency signal, the frequencies of which are peculiar to the particular sending station or location. A pulse operated reed switch is placed at the output of each sending station and permits the modulated signal to be transmitted therefrom in response to the presence of an output at one of the condition response sensors. The signal is transmitted to a central location containing a plurality of receiving stations, and the transmitted signal will actuate that receiving station which is frequency-tuned to the transmitted signal. An arrangement of Zener diode and silicon controlled rectifier detectors are used to sense the D.C. voltage level to identify the condition existing at the sending or remote station.

10 Claims, 9 Drawing Figures

INVENTOR
ANTHONY P. FAIRCHILD

BY

ATTORNEYS

INVENTOR
ANTHONY P. FAIRCHILD

BY

ATTORNEYS

ELECTRONIC ALARM SYSTEM

BACKGROUND OF THE INVENTION

This invention is related to electrical remote indication systems, and more particularly to such systems which are used for indicating at a central location an alarm condition detected by any one of a plurality of detectors at a number of remotely located stations.

It is frequently desirable to be able to monitor a plurality of ambient conditions at remotely located points, and it is known to use constant surveillance alarm systems for this purpose. For example, such systems might be employed to monitor a number of different zones in a multi-stored building to protect against fire, intrusion and the like. Generally, it is desirable to be able to provide such a service to a number of such buildings and other locations, as well. There is a wide variety of applications for such systems, and these are known to those skilled in the art.

In known systems for monitoring a plurality of ambient conditions at a plurality of remote locations, condition-responsive sensing devices are generally placed at various locations, and signals therefrom are transmitted to a central station. In many of these known systems, it is customary to provide at the central station a separate indicating light or other indicating means for each of the sensing devices and to connect these two components by separate wires. This is satisfactory in only the most simple systems, since, as the number of conditions to be sensed at each location and the number of locations at which the various conditions are to be sensed increases, the cost and complexity of the system becomes prohibitive owing to the large number of conductors required. Added to this is the factor of distance. If the remote locations are at a considerable distance from the central station, it becomes impractical to monitor but only a very limited number of conditions at the remote locations. Obviously, the usefulness of these systems is questionable.

In order to overcome these limitations, it has been known to employ multiplexed systems where a plurality of sensing devices may be connected to a common line in such a manner that individual detector signals may be transmitted to a central station on a sampled basis. Time division or frequency division multiplex techniques are known and may be used for this purpose. However, in either of the latter cases, complex and sophisticated modulators are required at each remote location, and demodulators of the same complexity are required at the central station. As is known, synchronization between the sending stations and the receiving station is often a problem. While the multiplex systems have proved useful in a number of remote indicating systems involving a plurality of sensing devices or detectors at each of several remote locations, the cost of such systems has become prohibitive for wide spread general use, and as is generally the case with complex systems, reliability presents a serious problem.

It is desirable in remote alarm systems to be able to use, for obvious economic reasons, relatively unskilled personnel to monitor the inputs to the central station. If, however, difficulties should arise, such personnel will generally be unable to repair the complex equipment described hereinabove. The need for immediate repair is obvious in view of the fact that such systems in order to be truly effective must operate continuously. Therefore, in the relatively complex systems described hereinabove, it is necessary to provide expensive technically skilled personnel at central stations in order to insure that the system is continuously operative. It would, therefore, be highly desirable to have a system in which difficulties can be readily ascertained by unskilled personnel, and which lends itself to repair by such unskilled personnel.

It is, therefore, an object of this invention to provide a remote indicating or alarm system useful for monitoring a plurality of conditions at any number of remote locations which is simple in construction, inexpensive to manufacture and easily maintained and repaired by relatively unskilled personnel.

It is another object of this invention to provide an electronic alarm system for detecting a plurality of different alarm conditions at a number of remote locations and which registers the detected conditions at a central station with improved reliability.

SUMMARY OF THE INVENTION

The foregoing and other objects are attained by utilizing the principles of this invention in which a number of condition responsive detectors are provided at each remote location which is to be monitored. When actuated, a condition responsive detector will produce a step voltage output having an amplitude uniquely identifiable with that particular detector. That is, a given amplitude signal is indicative of the existence of a given condition at the location. When one of the condition responsive detectors at the location is actuated, it, in turn, actuates an identity signal generator which produces a dual frequency signal, one of which signals modulates the step voltage output of the condition responsive detector. The frequencies are uniquely identifiable with the particular location or transmitter. This signal may then be transmitted in a keyed manner. The signal so generated may be transmitted over existing telephone lines.

The transmitted signal is received at a central station which is constituted by a large number of receiving stations, each of which may be designed to receive the outputs of one particular remote location. The transmitted signal is passed through parallel bandpass filters, which in the receiver station in question are designed to pass the particular dual frequencies on the transmitted signal. The presence of both of the frequencies which the input section of the receiving station is designed to pass will actuate an AND gate, which closes a connection permitting the transmitted signal to pass through the main detector portion of the receiving station. The latter main detecting portion is constituted by a plurality of voltage detectors, one of which corresponds to each condition responsive detector in the particular remote location which is identified with this receiving station. Each such voltage detector is responsive to a particular voltage level which will indicate a particular condition existing at the remote location being monitored.

A checking system is provided which will permit a periodic determination that each location in the system is operating properly.

BRIEF DESCRIPTION OF THE DRAWINGS:

The invention will be better understood by reference to a description of a preferred embodiment given hereinbelow in conjunction with the drawings in which.

DETAILED DESCRIPTION OF THE DRAWINGS

Figure 1:
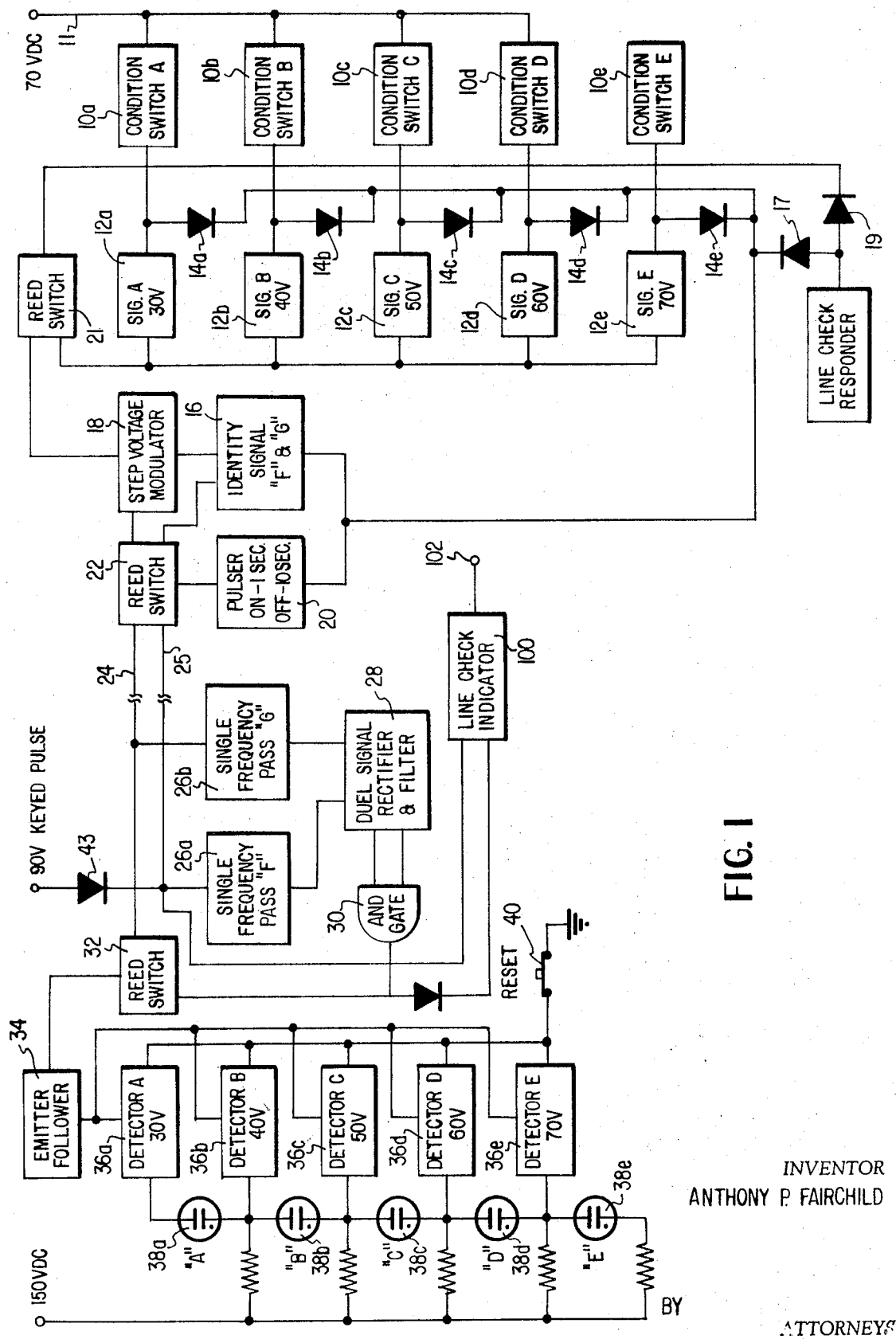
FIG. 1 is a schematic block diagram of a remote sending station and a receiving station in a central station interconnected by a transmission line.

FIG. 1 illustrates in essentially block diagram form the construction of a preferred embodiment of a remotely located sending station, and its associated receiving station in the central location. It is to be understood that in a given system constructed according to the principles of the invention, a large number of sending stations may be used in widely dispersed locations, and a correspondingly large number of receiving stations will be provided at the central station. The sending stations will be connected with the central station by a plurality of transmission lines.

At the remotely located sending station, a plurality of condition responsive switch means 10 a–e are located, as necessary, to sense various environmental conditions. It is contemplated that any number of condition responsive switches may be used at any given remote location. Any of the wide variety of conventional switch means which are available for such purposes may be used so long as the output is an electrical signal which may be sensed for further processing. A wide variety of such known switches are available to sense environmental conditions such as excessive temperature, smoke, intrusion and the like, and any of these may be used.

The outputs of the condition responsive switches 10 a–e are connected, respectively, to the inputs of signal generators 12 a–e. These signal generators produce step voltage outputs in response to receiving an electrical signal through an actuated condition responsive switch. It will be noted that each of the signal generators 12 a–e produces a different voltage. The construction of such a generator is described hereinbelow with respect to FIG. 3. Obviously, these differing voltages can be used to identify which of the condition response switches have been actuated, and their use for this purpose will be discussed more fully hereinbelow. In the preferred embodiment, 10 volt increments are used for separating the outputs of the various step voltage signal generators, but any arrangement of differing voltages may be used. The 30 volt minimum was chosen for this embodiment in order to overcome ambient line noise on existing telephone lines.

The outputs of the condition responsive switches 10 a–e are also routed to an identity signal generator 16 which produces the dual frequency signals F and G. In the preferred embodiment, a 10 volt peak to peak alternating output is obtained from this signal generator, but any value may be used. Any of the well known types of alternating current signal generators may be used for this purpose, as well.

The outputs from the condition responsive switches 10 a–e are also routed to a conventional pulse generator 20. The pulse generator in the preferred embodiment is activated by the presence of a signal from a condition responsive switch to produce a pulse train having a 0.1 duty cycle, or a one second on period and a ten second off period. This pulse train, in turn, operates a reed switch 22 which allows signals to pass from this sending station to the transmission lines 24 and 25 to the central station. It will be noted that the outputs from the condition responsive switches 10 a–e leading to the identity signal generator 16 and the pulse generator 20 must pass through, respectively, diodes 14 a–e. The presence of these diodes insures that spurious responses from the condition responsive switches will not be transmitted from the sending station. That is, the diodes may be chosen to have a threshold of conductivity which is of a sufficiently high magnitude that only the voltage level passed by a normally operating condition responsive switch will be allowed to pass through to the identity signal generator and a pulse generator. Obviously, if the pulse generator 20 is not actuated, no signal will pass from the sending station through transmission lines 24 and 25 to the central station.

The signal which is transmitted from the sending station is formed in step voltage modulator 18. In this element, the step voltage outputs from the step voltage signal generators 12 a–e are modulated by one of the 10 volt peak to peak alternating, dual frequency outputs G of the identity signal generator 16. This is the signal which is passed by reed switch 22 to transmission line 24. The other frequency signal, signal F, is transmitted over line 25.

It is contemplated that the transmission lines 24 and 25 used for communicating signals from the various remote locations to the receiving stations at the central station may be a conventional pair of telephone lines balanced to ground. The frequencies selected for the identity signals F and G may be selected to be within the bandwidths normally accommodated by existing telephone lines. Of course, any other known arrangement of transmission lines may be used within the scope of the invention.

In the receiving station associated with the sending station previously described, the transmitted signal from lines 24 and 25 will be coupled to single frequency pass band filters 26a and 26b, respectively. If the dual frequencies on the transmission lines are frequencies F and G, these frequencies will pass through the two filters. The various other receiving station circuits in the central station will, of course, have dual single frequency filters designed to pass other frequencies corresponding to other sending stations. Thus, the location of the source of the signal will be clearly identified by the receiving station which processes that signal.

The outputs of the filters 26a and 26b are passed to a dual signal rectifier and filter 28. In this element, the signal is rectified, and the alternating components are shunted to ground. The outputs of rectifier-filter 28 are coupled to an AND gate 30, which will produce an output when the dual frequency signals on the transmission lines 24 and 25 pass through the filters 26a and 26b.

An output from AND gate 30 will close reed switch 32 and allow the modulated signal on the transmission line 24 to pass through the reed switch into the voltage detector portion of the receiving station. The transmitted signal passing through the reed switch is current amplified in this embodiment in a conventional emitter follower 34.

The amplified transmitted signal is then coupled to a series connected group of voltage detectors 36a–36e. Each voltage detector has a threshold level which increases in increments corresponding to the increments used for the step voltage signal generators 12 a–e. Therefore, actuation of the voltage detector of the highest possible value will correspond to actuation of a particular step signal generator at that voltage level in the sending station. Each of the voltage detectors 36a – 36e has associated therewith, respectively, a lamp 38a – e. Therefore, actuation of voltage detector 36a, for example, will cause the lamp 38a to be energized indicating that condition responsive switch 10a producing signal A in the sending station has been closed. The lamps 38a – e may be neon tubes or any other conventional type of indicating lamp which may be found to be suitable. The construction and operation of the voltage detectors 36a – e will be described in greater detail hereinbelow in conjunction with FIG. 8.

A reset switch 40 is provided to break the circuits of the voltage detectors after an indication has been noted.

This figure also illustrates a means by which the system may be periodically tested in order to determine that it is operating properly. In each receiving station, a source of a keyed pulse is provided. In this embodiment, a 90 volt keyed pulse is used. This pulse is passed through a diode 43 selected to prevent spurious outputs and is transmitted to a plurality of sending stations over transmission line 25.

The keyed pulse is communicated to a line check indicator 100 in the receiver station, where it actuates a lamp 102. Simultaneously, the keyed pulse is transmitted to line check responder 15 in the sending station. The latter element may be any desired type of pulse generator, which will produce the desired type of pulse. In this embodiment, a pulse generator producing one second, 70 volt pulses is used. The latter pulse is passed through a diode 17 to activate generators 16 and 20, and it is passed through diode 19 to open normally closed reed switch 21. By opening switch 21, alarm signals are blocked from modulator 18 and from being transmitted for the duration of the line check. However, this will only be for a minimum time period corresponding to the duration of the keyed pulse.

As a result of being so activated, generators 16 and 20 will cause dual frequencies F and G to be transmitted, and they will be received in the manner to be described more fully below. The reception of these two frequencies in the receiving station will extinguish lamp 102 indicating the system is functioning properly. Line check indicator 100 will be described in detail in conjunction with FIG. 9.

Figure 2:
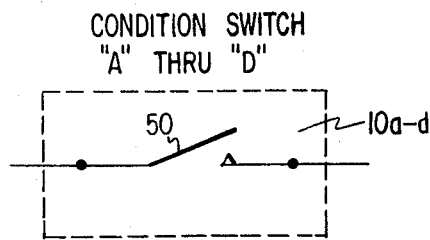
FIG. 2 is illustrative of a condition responsive switch in the FIG. 1 embodiment.

FIG. 2 illustrates a simple single pole-single throw switch 50 which is in effect the analogue of the switches which may be used for condition responsive switches 10a – e. It is desired only that the condition responsive switches, whatever their particular construction, operate to connect the 70 volt source of D.C. voltage 11 through to the appropriate one of the step voltage signal generators 12 a–e. As mentioned hereinabove, condition responsive switches which will accomplish this result are well known and need not be described further herein.

Figure 3:
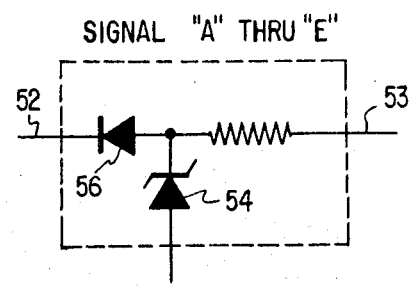
FIG. 3 is a preferred embodiment of a signal means in the FIG. 1 embodiment.

FIG. 3 is a schematic diagram of the circuitry which may be used for the step voltage signal generators 12 a–e. If the condition responsive switch associated with the particular step voltage signal generator is closed, the D.C. voltage will be coupled to the generator through terminal 52 and series-connected diode 56. The generator also contains a shunt connected Zener diode 54 across which the output voltage for the generator will appear. The Zener diode may be selected so that the output voltage at terminal 53 will correspond to the desired signal level to indicate the actuation of a particular condition responsive switch. For example, Zener diode 54 may be selected so that it will shunt 30 volts of the 70 volt signal passing through the condition responsive switch, and a 40 volt signal corresponding to signal B will appear across it. The other Zener diodes for the other signal generators may be selected to provide the other indicated outputs.

Figure 4:
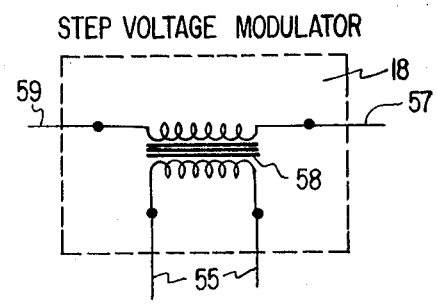
FIG. 4 is a preferred embodiment of the step voltage modulator in the FIG. 1 embodiment.

FIG. 4 illustrates a typical embodiment for the step voltage modulator 18. This modulator is merely constituted by a series connected transformer 58. The step voltage signal from one of the step voltage signal generators is connected to secondary terminal 57, and the alternating identity signal G is connected to the primary terminals 55. The resulting output signal will appear at secondary terminal 59.

Figure 5:
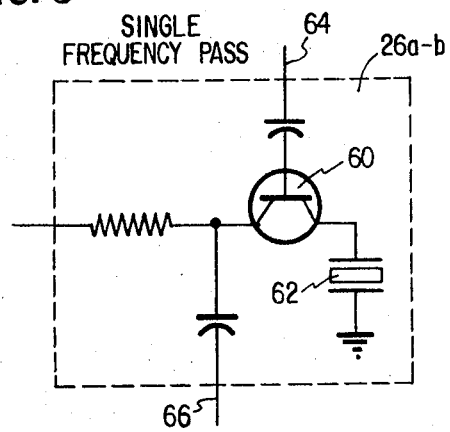
FIG. 5 is a preferred embodiment of one of the single frequency pass devices in the FIG. 1 embodiment.

The circuit in FIG. 5 is illustrative of a single frequency pass band filter which may be used for either one of the elements 26a or 26b. The configuration shown is a conventional active filter utilizing a common emitter transistor amplifier. The transmitted signal is coupled to the transistor 60 through base connection 64, and the output signal from the filter is taken from collector connection 66. A ceramic filter 62 is provided in the emitter lead, and this is, of course, determinative of the band pass characteristics of this circuit. The operation of such filters is known and need not be further discussed herein.

Figure 6:
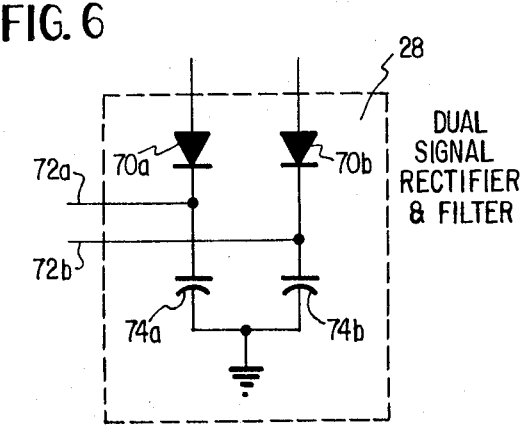
FIG. 6 is a preferred embodiment of the dual signal rectified filter in the FIG. 1 embodiment.

FIG. 6 illustrates a preferred circuit arrangement for the dual signal filter and rectifier 28. The output signals from filters 26a and 26b are coupled to filter-rectifier 28 through leads 72a and 72b, respectively. Diodes 70a and 70b rectify this signal, and any alternating components are shunted to ground through capacitors 74a and 74b.

Figure 7:
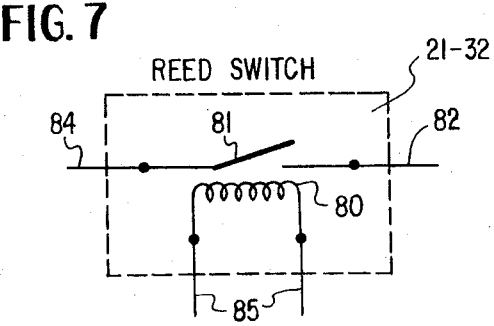
FIG. 7 is a preferred embodiment of the reed switches in the FIG. 1 embodiment.

FIG. 7 is an illustrative embodiment of the reed switches 21 and 32. The construction here shown is conventional. The input terminals 85 to coil 80 receive the output from pulse generator 15 in the case of switch 21, or receive the AND gate output in the case of reed switch 32. A magnetic field is created which acts on switch member 81 to complete the circuit between leads 82 and 84. Reed switch 22 (not illustrated in detail) is similar in construction. However, as is obvious, dual switches are used with a single coil.

Figure 8:
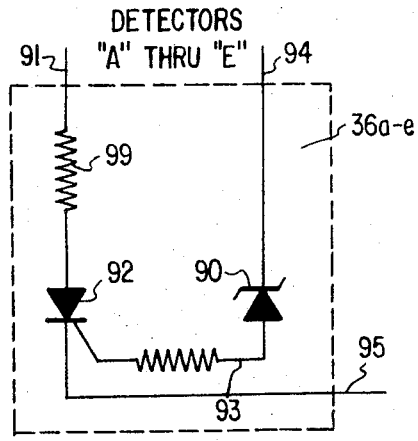
FIG. 8 is a preferred embodiment of the individual voltage detectors in the FIG. 1 embodiment.

FIG. 8 discloses a preferred form for the voltage detectors 36 a–e. In each circuit, a Zener diode 90 is arranged to receive, through lead 94, the amplified modulated signal from emitter follower 34. A silicon controlled rectifier 92 is provided having a terminal 91 connected to a D.C. voltage source, through a lamp, e.g., lamp 38a, and its other terminal connected to ground through lead 95 and normally closed reset switch 40. The gate voltage for the silicon control rectifier is provided through lead 93 which is connected to the Zener diode to receive the output therefrom.

From the construction described hereinabove, it is clear that if the voltage passing through Zener diode 90 is of the appropriate magnitude, the silicon controlled rectifier 92 will be triggered into conduction. Upon conduction of a silicon controlled rectifier, the lamp associated therewith will be actuated. The actuation of a given lamp indicates that the condition responsive switch corresponding to this particular voltage detector in the sending station has been actuated. Other indicating devices, such as audible alarms, may be connected, as well, to the silicon controlled rectifier to be actuated thereby.

The Zener diode 90 for each of the voltage detectors must be selected to block an amount of the transmitted signal voltage substantially corresponding to the step voltage increments between the various signal generators 12 a–e in the sending station. The operations of the voltage detectors taken together will be more readily understood by the overall description of the operation of this circuit to be given hereinbelow.

Figure 9:
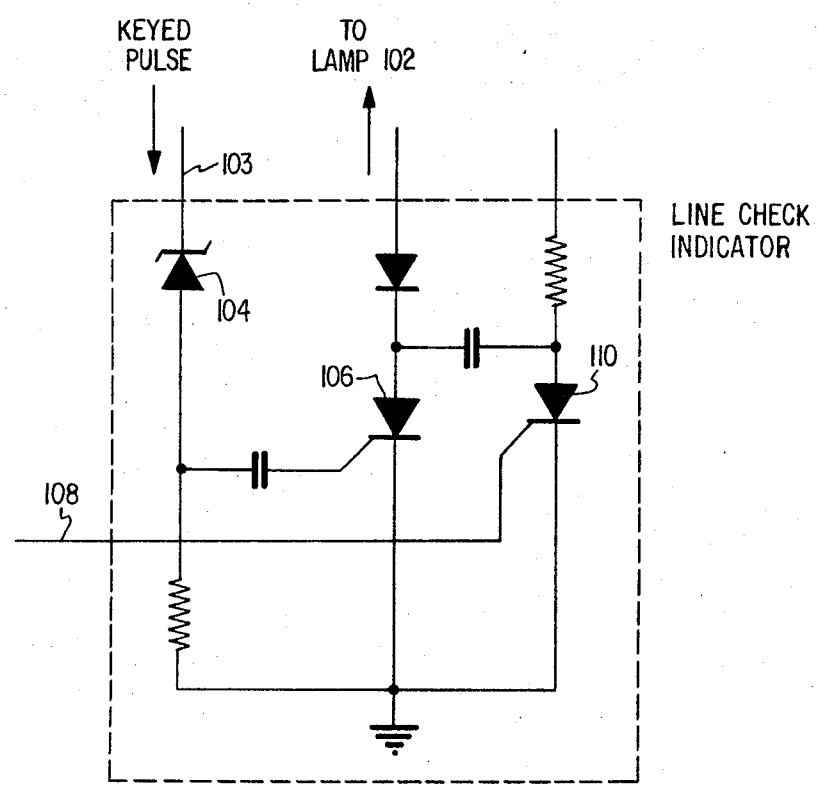
FIG. 9 is a preferred embodiment of the line check indicator in the FIG. 1 embodiment.

In FIG. 9 is shown an illustrative embodiment of the line check indicator 100. The keyed pulse is introduced over lead 103, and is blocked by Zener diode 104 to produce a 10 volt pulse for triggering silicon controlled rectifier 106 and thereby turn on lamp 102. The latter occurs substantially simultaneously with transmission of the keyed pulse to line check responder 15. In activating the responder, as described hereinabove, identity signals, e.g., F and G, are transmitted from the sending station in question. These produce, in the described manner, an output from AND gate 30, which is received in line check indicator 100 over lead 108. This signal will trigger silicon controlled rectifier 110 extinguishing lamp 102. If the received had not received the identity signals, lamp 102 would have remained lighted indicating trouble.

In describing the operation of the complete system, reference will principally be made to the complete diagram of a connected sending and receiving station in FIG. 1. Again, it must be remembered that each central station will have a large number of receiving station circuits like that illustrated in FIG. 1 and described hereinabove. Each of these receiving stations will be related to a particular remote location, the latter having a plurality of condition responsive switches, each condition responsive switch being activated by possibly a different ambient condition.

In describing the operation of the system, it will be assumed that condition responsive switch 10b is activated to produce a step voltage signal B. Closure of switch 10b will cause the positive 70 volts D.C. from terminal 11 to pass to step signal generator 12b. The step signal generator operates in the manner described hereinabove in conjunction with FIG. 3 to produce a 40 volt step signal which is communicated to step voltage modulator 18. Simultaneously, the positive 70 volt D.C. signal passing through condition responsive switch 10b is coupled through diode 14b to pulse generator 20 and identity signal generator 16. In response to the latter 70 volt D.C. signal identity signal generator 16 is actuated to produce 10 volt peak to peak alternating signals at the two frequencies F and G. Alternating signal G is coupled to the step voltage modulator 18 wherein it modules the 40 volt step signal by plus or minus 5 volts so the amplitude of the modulator signal will fluctuate between a positive 35 volts and a positive 45 volts.

When pulse generator 20 receives the 70 volt D.C. signal from condition responsive switch 10b, it is triggered to produce a pulse train, which in this case is constituted by a series of one second pulses separated by 10 second intervals. Of course, other pulse time parameters may be used. A pulse from pulse generator 20 will cause reed switch 22 to close, thereby allowing the alternating identity signals F and G from identity signal generator 16 to pass out of the sending station and be transmitted through transmission lines 24 and 25.

The modulated signal will be received by each of the receiving station circuits at the central station. However, it will actuate only the receiving station to be described hereinbelow because of the presence of single frequency band pass filters 26a and 26b. Because the transmitted dual frequencies are frequencies F and G, both filters 26a and 26e, which are respectively, tuned to frequencies F and G, are caused to pass signals therethrough to the dual signal filter and rectifier 28. At this point, the two signals from the two filters are rectified and coupled to AND gate 30. Obviously, this gate will respond only if both of the frequencies designed to be passed by filters 26a and 26b are present. Other frequencies will cause other receiving stations to respond. The output from AND gate 30 will cause reed switch 32 to close allowing the modulated signal from the sending station on line 24 to be coupled to emitter follower amplifier 34. The emitter follower operates in the conventional manner to give the modulated signal current gain before passing it to the series connected group of voltage detectors 36a – e.

The modulated signal which is alternating between 35 volts and 45 volts is coupled to Zener diode 90 in voltage detector 36a. (It is, of course, received by the Zener diodes in each voltage detector.). This Zener diode is selected to block 25 volts of the signal so that the signal passing through the Zener diode will fluctuate between 10 and 20 volts. This will be sufficient to trigger silicon controlled rectifier 92 into operation, in view of the fact, that this silicon controlled rectifier has been selected to have a firing voltage of approximately 3 volts. In firing silicon controlled rectifier 92, in detector 36a, the lamp 38a is caused to glow.

The alternating 35 to 45 volt signal will also be coupled to the Zener diode 90 in detector 36b. This Zener diode is selected to block 35 volts, and only the 10 volt positive peaks of the signal will pass through the Zener diode in this detector. This will be sufficient to cause the silicon controlled rectifier therein to fire. Of course, lamp 38b will be turned on, while lamp 38a will be extinguished. The Zener diode in detector 36c is selected to block 45 volts, so that no portion of the modulated signal will pass therethrough. Accordingly, lamp 38b will be the last lamp actuated indicating that condition responsive switch 10b in the sending station was closed.

If, for example, voltage detector 36c were to be actuated to cause lamp 38c to glow, the modulating signal must have an amplitude fluctuating between at least 45 to 55 volts in accordance with the component values selected for this example.

After an alarm has been received, the system may be reset merely by opening reset switch 40 which will break the conductive circuits of the silicon controlled rectifiers.

Although not described herein in detail, it is contemplated that a conventional transmission line delay device will be provided at the output of each sending station. This device will function to delay an alarm output of the sending station associated therewith, if another sending station is simultaneously transmitting. This will insure that each alarm condition is properly registered. Devices for accomplishing this purpose are known and for that reason will not be further discussed herein.

The simplicity of the sending and receiving station circuitry described hereinabove will make it possible for printed circuit board or integrated circuit techniques to be used in the manufacture of this circuitry. If, for example, each of the receiver station circuits are constructed on printed circuit boards, it is clear that repairs to an individual receiver station circuit may be made by unskilled personnel simply by changing circuit boards. The circuit testing mechanism discussed hereinabove also makes it possible for unskilled personnel to make a determination as to whether or not each of the receiver stations and their corresponding sending stations are operating properly. If, for example, a break in the line at a sending station does occur, it will be sensed by the checking mechanism, and it will only be a matter of replacing a circuit board in order to place this portion of the system back into operation.

The description of a preferred embodiment constructed according to the principles of the invention given hereinabove is only exemplary, and it is contemplated that many changes and modifications may be made to this embodiment within the scope of the appended claims. In particular, it should be noted that the voltage values used in describing the preferred embodiment may be varied depending on the application. Furthermore, a number of different types of components and component arrangements may be used to perform the functions defined by the claims.

I claim:

1. An electronic alarm system having at least one sending station and at least one receiving station, said stations being interconnected by a transmission line, said sending station comprising:

a plurality of condition responsive switch means, a plurality of voltage producing means, each of said voltage producing means being actuated by one of said condition responsive switch means, each said voltage producing means, when actuated, producing a voltage of a value differing from the voltages of the others of said voltage producing means, thereby producing an indication of which of the condition responsive switch means has been actuated, signal generating means in said sending station for producing a signal having a characteristic peculiar to that sending station and means for transmitting said voltages and said characteristic signal from said sending station over said transmission line;

said receiving station comprising:

means for receiving said transmitted voltages and said characteristic signal, a plurality of voltage detecting means, each said detecting means being responsive to a different one of the voltage values produced in said sending means to produce an output voltage indicative of the presence of said one voltage value in the received signal, thereby producing an indication at said receiving station of which of said condition responsive switch means has been activated and, signal detecting means in said receiving station for detecting the presence of said characteristic signal corresponding to said sending station and for allowing said received voltages to pass to said voltage detecting means when said characteristic signal is present.

2. The electronic alarm system defined in claim 1, wherein each said voltage producing means, when actuated, produces a step voltage of an amplitude differing from the voltage amplitudes produced by the other voltage producing means.

3. The electronic alarm system defined in claim 1, wherein said signal generating means comprises a dual frequency signal generator, and wherein said signal detecting means includes means for detecting a predetermined pair of frequencies and for allowing said received voltages to pass to said voltage detecting means when a predetermined pair of frequencies are found to be present on the received signal.

4. The electronic alarm system defined in claim 3, wherein said means for transmitting includes means for combining one of the outputs of said dual frequency signal generator with the outputs of said plurality of voltage producing means prior to transmission over said transmission line.

5. The electronic alarm system defined in claim 3 further comprising:

means, initiated at said receiving station, for transmitting a test signal from a receiving station over said transmission line to a sending station, responder means in said sending station which, responsive to receipt of said test signal, causes said dual frequency signal to be transmitted over said transmission line, and indicating means in said receiving means responsive to reception of an output from said means for detecting a predetermined pair of frequencies for indicating proper reception of said dual frequencies.

6. The electronic alarm system defined in claim 1, wherein said transmission line is a conventional telephone line.

7. The electronic alarm system defined in claim 1 wherein each said voltage detecting means in said receiving station comprises a voltage blocking means for blocking those voltages which do not exceed a predetermined level, said predetermined levels for the plurality of voltage detecting means substantially corresponding, respectively, to the voltage output values of said voltage producing means, and an output producing means, having a predetermined sensitivity, connected to be activated by the output of said voltage blocking means for indicating an alarm condition corresponding to said predetermined voltage level.

8. The electronic alarm system defined in claim 7 wherein each said voltage blocking means comprises a Zener diode and each said output producing means comprises a silicon controlled rectifier receiving its gating voltage from the output of said Zener diode.

9. The electronic alarm system defined in claim 1 additionally comprising:

means, initiated at said receiving station, for causing a test signal to be transmitted from said receiving station to said sending station, responder means in said sending station for transmitting a response signal responsive to said test signal, and indicating means in said receiving station for indicating proper receipt of said response signal.

10. The electronic alarm system defined in claim 8 wherein said Zener diodes have substantially equal threshold sensitivity levels.

* * * * *